Inventor
Earl A. Johnson
By Clarence A. O'Brien
Attorney

Patented Sept. 2, 1941

2,254,822

UNITED STATES PATENT OFFICE 2,254,822

FRONT WHEEL SUSPENSION FOR MOTOR VEHICLES

Earl A. Johnson, Iron River, Mich.

Application June 18, 1940, Serial No. 341,205

1 Claim. (Cl. 267—20)

The present invention relates to new and useful improvements in front wheel suspensions for motor vehicles and has for one of its important objects to provide, in a manner as hereinafter set forth, a structure of this character wherein a single spring is provided for both wheels.

Another very important object of the invention is to provide a front wheel suspension of the aforementioned character embodying a novel construction and arrangement for stabilizing and leveling the vehicle when traveling over irregularities or negotiating curves.

Other objects of the invention are to provide a motor vehicle front wheel suspension of the character described which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
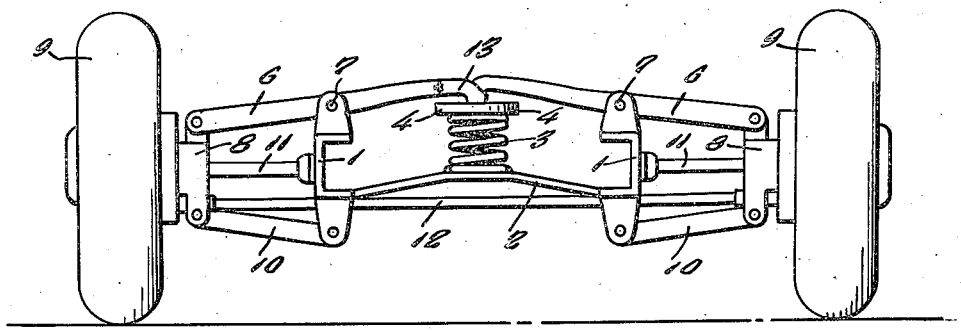
Figure 1 is a view in front elevation of a front wheel suspension constructed in accordance with the present invention.
Figure 2:
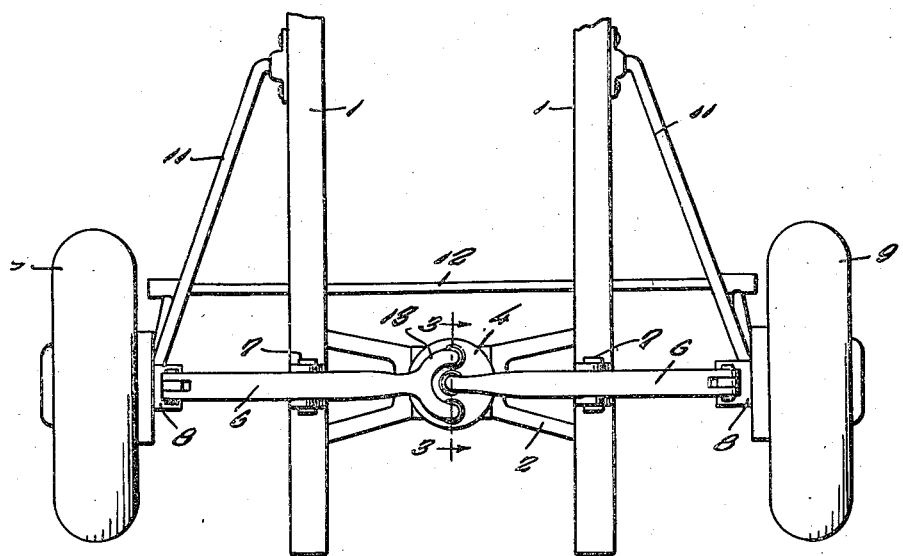
Figure 2 is a top plan view thereof.
Figure 3:
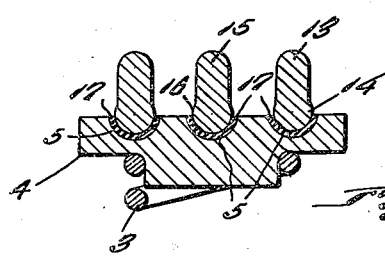
Figure 3 is a vertical sectional view, taken substantially on the line 3—3 of Fig. 2.

Referring now to the drawing in detail, it will be seen that the reference numeral 1 designates the two side members of the frame of a motor vehicle. Extending between the forward portions of the side members 1 is a metallic base 2, said base also constituting a cross member or brace for the vehicle frame. Secured on an intermediate portion of the base 2 is a coil spring 3 having mounted thereon a platform or plate 4. As illustrated to advantage in Fig. 3 of the drawing, the platform 4 has formed therein a plurality of recesses or sockets 5 the purpose of which will be presently set forth.

The reference numeral 6 designates a pair of transverse levers which are pivotally mounted at an intermediate point, as at 7, on the side members 1 of the vehicle frame. Pivotally mounted on the outer end portions of the levers 6 are castings or metallic bodies 8 which carry the spindles (not shown) on which the front wheels 9 of the vehicle are journaled. Links 10 are pivotally connected at one end to the lower portions of the castings 8 and at their other ends to the side members 1 for maintaining the front wheels 9 in a substantially vertical plane during upward and downward movement thereof. Extending rearwardly from the castings 8 to the side members 1 of the vehicle frame are braces 11. A tie rod 12 connects the stub axles or spindles of the vehicle.

On the inner end of one of the levers 6 is a fork 13 comprising downturned end portions terminating in ball heads 14 (see Fig. 3) which rest in the outer sockets or depressions 5. The other lever 6 terminates in a downturned inner end portion 15 provided with a ball head 16 which is engaged in the intermediate socket or depression 5. Rubber cushions 17 are provided in the sockets or depressions 5 for the heads or enlargements 14 and 16.

It is thought that the manner in which the invention functions will be readily apparent from a consideration of the foregoing. Briefly, the load of the front of the vehicle is carried by the single coil spring 3 to which it is transmitted through the levers 6. Now, when a turn is made the load on that side of the vehicle is decreased by the action of centrifugal force and a corresponding increase occurs in the load on the opposite side. This increase in the load on the opposite or outside lever 6 causes said lever to compress the coil spring 3 which is supporting the other lever with the result that the inner end of said other lever swings downwardly and in this manner the front end of the vehicle is maintained substantially level. Also, when one of the wheels is traveling over irregularities the weight or load is automatically transferred to the other wheel in a manner to materially stabilize the vehicle and promote riding comfort.

It is believed that the many advantages of a front wheel suspension for motor vehicles constructed in accordance with the present invention will be readily understood and although a preferred embodiment is as illustrated and described, it is to be understood that changes in the details of construction and in the combination and arrangement of parts may be resorted to which will fall within the scope of the invention as claimed.

What is claimed is:

In a motor vehicle comprising a frame including a pair of spaced side members, a base extending between said side members, a coil spring mounted on said base, a platform mounted on said coil spring and having a plurality of sockets therein, levers mounted transversely on top of the side members, wheel carrying members pivotally mounted on the outer ends of said levers, links connected to the bottoms of the side members and to the wheel carrying members for maintaining the wheels in a substantially vertical position, one of the levers including a downturned inner end portion terminating in a ball engaged in one of the sockets in the platform, and a fork on the inner end of the other lever comprising downturned end portions terminating in balls engaged in the remaining sockets, said platform constituting means for yieldingly supporting the inner ends of the levers.

EARL A. JOHNSON.